United States Patent
Wu

(10) Patent No.: US 6,751,013 B1
(45) Date of Patent: Jun. 15, 2004

(54) GAIN-CLAMPED SEMICONDUCTOR OPTICAL AMPLIFIERS WITH ADJUSTABLE GAIN LEVELS

(75) Inventor: Yongan Wu, San Jose, CA (US)

(73) Assignee: Onetta, Inc., Sunnyvale, CA (US)

(*) Notice: Subject to any disclaimer, the term of this patent is extended or adjusted under 35 U.S.C. 154(b) by 13 days.

(21) Appl. No.: 10/270,779

(22) Filed: Oct. 10, 2002

Related U.S. Application Data

(60) Provisional application No. 60/348,133, filed on Jan. 15, 2002.

(51) Int. Cl.[7] .................................................. H01S 3/00
(52) U.S. Cl. ........................................ 359/337; 359/344
(58) Field of Search ................................. 359/344, 337

(56) References Cited

U.S. PATENT DOCUMENTS 6,249,373 B1 * 6/2001 Woodward .................. 359/344
6,563,631 B2 * 5/2003 Delprat et al. .............. 359/344
6,597,497 B2 * 7/2003 Wang et al. ................ 359/344

FOREIGN PATENT DOCUMENTS

EP          1172907 A1  *  1/2002
WO    WO 03/021733 A1  *  3/2003

* cited by examiner

*Primary Examiner*—Mark Hellner
(74) *Attorney, Agent, or Firm*—G. Victor Treyz

(57) ABSTRACT

Gain-clamped semiconductor optical amplifier devices are provided that have adjustable gain levels. Optical amplifiers and other network equipment based on the semiconductor optical amplifier devices are also provided. The devices may include feedback structures that form a lasing cavity. The optical feedback associated with the feedback structures may be adjusted to control the clamped gain of the devices.

11 Claims, 3 Drawing Sheets

GAIN-CLAMPED SEMICONDUCTOR OPTICAL AMPLIFIERS WITH ADJUSTABLE GAIN LEVELS

This application claims the benefit of provisional patent application No. 60/348,133, filed Jan. 15, 2002.

BACKGROUND OF THE INVENTION

The present invention relates to fiber-optic communications networks, and more particularly, to optical network equipment such as optical amplifiers based on gain-clamped semiconductor optical amplifier devices with adjustable gain levels.

Fiber-optic networks are used to support voice and data communications. In optical networks that use wavelength division multiplexing, multiple wavelengths of light are used to support multiple communications channels in a signal band on a single fiber.

Optical amplifiers are used in fiber-optic networks to amplify optical signals. For example, optical amplifiers may be used to amplify optical data signals in the signal band that have been subject to attenuation over fiber-optic paths. A typical amplifier may include erbium-doped fiber coils that are pumped with diode lasers. Raman amplifiers and semiconductor optical amplifiers have also been investigated.

To reduce the effects of cross-talk, semiconductor optical amplifier devices may be gain clamped. With this type of arrangement, the waveguide portion of the semiconductor optical amplifier has a grating that creates feedback at a feedback wavelength that is outside of the signal band. The feedback grating extends along the entire length of the waveguide and induces lasing at the feedback wavelength. Because the semiconductor optical amplifier is lasing, the gain of the amplifier cannot exceed the loss of the amplifier at the lasing wavelength. This type of arrangement clamps the gain of the semiconductor optical amplifier at the laser wavelength and the wavelengths in the signal band.

With such gain clamped structures, the gain level cannot be varied. The grating may introduce large optical losses in the signal band, because the signals must traverse the gratings. In addition, the yields encountered when manufacturing such devices may be low, because it may be difficult to precisely achieve the desired gain level.

It is an object of the present invention to provide semiconductor optical amplifier arrangements with gain clamping and adjustable gain.

It is also an object of the present invention to provide optical network equipment such as optical amplifiers based on gain-clamped semiconductor optical amplifier devices that have adjustable gains.

SUMMARY OF THE INVENTION

These and other objects of the invention are accomplished in accordance with the present invention by providing gain-clamped semiconductor optical amplifier devices with adjustable gains and semiconductor optical amplifiers and other optical network equipment based on such semiconductor optical devices for use in handling optical data signals in a signal band in fiber-optic communications links. The fiber-optic communications links may carry a number of wavelength-division multiplexing channels each having a different corresponding wavelength. The equipment may use the semiconductor optical amplifier devices for providing optical gain for the optical signals.

Because the semiconductor optical amplifier devices are gain clamped, crosstalk between signals (i.e., between signals on different wavelength-division-multiplexing channels) is reduced. The ability to adjust the gain level of the devices may help to enhance the yield when manufacturing the devices. Optical amplifiers and other network equipment based on the gain-clamped semiconductor optical amplifier devices may be operated at different gain levels to accommodate installation of equipment of a given design in different network locations or to accommodate changing system requirements at a given equipment location.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
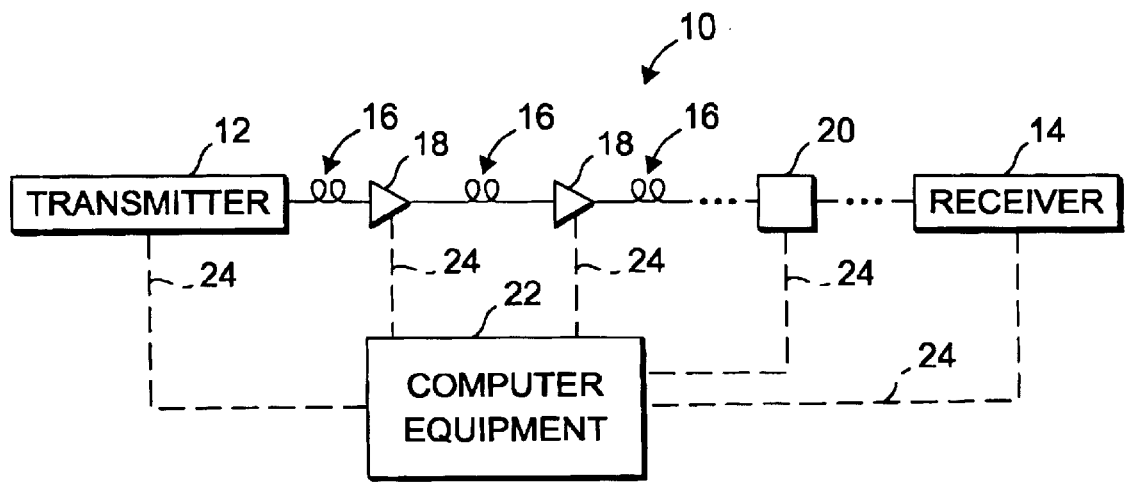
FIG. 1 is a schematic diagram of an illustrative fiber-optic communications link in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network. Link 10 may be a point-to-point link, part of a fiber ring network, or part of any other suitable network or system.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be based on semiconductor optical amplifier devices. If desired, optical amplifiers 18 may also include gain stages based on rare-earth-doped fiber amplifier gain stages such as erbium-doped fiber amplifier gain stages, gain stages that include discrete Raman-pumped coils, gain stages that include pumps for optically pumping spans of transmission fiber 16 to create optical gain through stimulated Raman scattering, combinations of such gain stages and semiconductor optical amplifier device gain stages, etc.

Link 10 may include optical network equipment such as transmitter 12, receiver 14, and amplifiers 18 and other optical network equipment 20 such as dispersion compensation modules, dynamic filter modules, add/drop multiplexers, optical channel monitor modules, Raman pump modules, optical switches, etc. For clarity, aspects of the present invention will be described primarily in the context of semiconductor optical amplifier devices and optical amplifiers based on semiconductor optical amplifier devices. This is, however, merely illustrative. The features of the present invention may be used in any suitable optical network equipment 20 with semiconductor optical amplifier devices or in other suitable arrangements.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Figure 2:
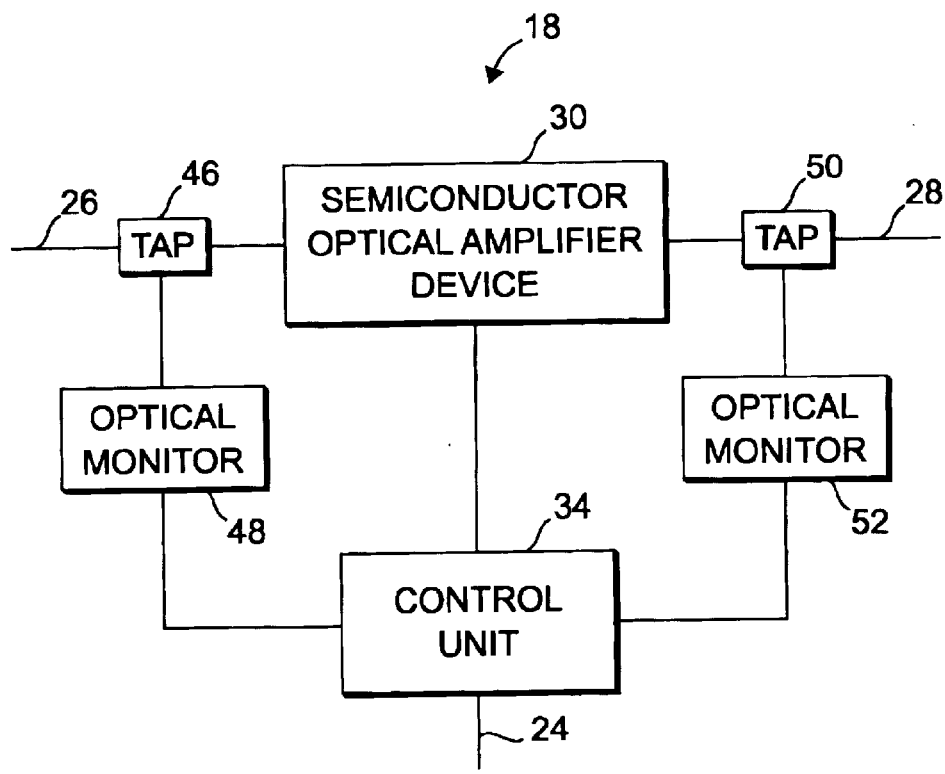
FIG. 2 is a schematic diagram of an illustrative optical amplifier in accordance with the present invention.

An illustrative optical amplifier 18 based on a semiconductor optical amplifier (SOA) device is shown in FIG. 2. Optical input signals may be provided to input fiber 26. When amplifier 18 is operating in a network, the optical input signals may be, for example, optical data signal traffic being carried on the wavelength-division-multiplexing channels in the signal band of link 10 that is provided to input fiber 26 over a span of fiber 16. When amplifier 18 is being tested, the optical signals provided to the input 26 may be test light from a suitable source such as a laser diode or array of laser diodes. One or more gain stages such as a gain stage based on a semiconductor optical amplifier device 30 may be used to provide optical gain for the optical signals. Corresponding amplified output signals may be provided at output fiber 28.

Amplifier 18 may contain additional optical and electrical components. Such components may include optical components that handle the optical data signals traveling from input 26 to output 28 and may include other components (e.g., temperature controllers such as thermoelectric cooling elements or TECs, pumps, optical monitors, etc.). The components may be located downstream from a first gain stage and upstream from a second gain stage or may be positioned at any other suitable location in amplifier 18. Optical components that may be used in amplifier 18 or other optical network equipment 20 may include optical switches, dispersion compensation elements, controllable dispersion compensation elements, static and dynamic spectral filters, pump couplers, taps and corresponding optical monitors, optical channel monitors, isolators, tilt controllers, variable optical attenuators, dispersion-compensating fiber and optically pumped fiber, add/drop multiplexers, or any other suitable optical components. Any suitable fiber-to-device optical connector arrangement may be used to couple the optical components and fibers in amplifier 18 to device 30 (e.g., butt coupling, discrete lens arrangements, lensed fiber arrangements, etc.).

A control unit 34 may be used to control the operation of components such as gain stage components and other components. Control unit 34 may be based on any suitable control circuitry and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc. Control unit 34 may include communications circuitry that supports the communications between control unit 34 and computer equipment such as computer equipment 22 of FIG. 1 or other equipment in the network over a path such as path 24.

Amplifier 18 may be based on an optical network card and may use the communications circuitry to communicate with a controller mounted in a rack in which the card is mounted when amplifier 18 is installed in a network. With this arrangement, the controller may be part of computer equipment 22 or may communicate with computer equipment 22. If desired, amplifier 18 may be implemented as a module that is part of an optical network card. The module may use the communications circuitry in unit 34 to communicate with a controller or other computer equipment 22 or to communicate with additional communications circuitry on the card that in turn supports communications with a controller or other computer equipment 22 in the network. During testing, the communications circuitry may be used to allow amplifier 18 to communicate with test equipment (e.g., local test equipment such as personal-computer-based test equipment or other suitable equipment). These are merely illustrative communications arrangements that may be used to allow amplifier 18 to communicate with other equipment. Any suitable arrangement may be used if desired.

Amplifier 18 may include components that allow control unit 34 to monitor the optical gain of semiconductor optical amplifier device 30 or amplifier 18. For example, amplifier 18 may have taps and optical monitors for tapping a fraction (e.g., 2%) of the light propagating through amplifier 18. In the example of FIG. 2, gain stage 30 has an input tap 46 and corresponding optical monitor 48 for measuring the power of the optical signals at fiber 26. Output tap 50 and corresponding optical monitor 52 may be used to make output power measurements at fiber 28. The optical monitors may be based on photodetectors or any other suitable optical monitoring arrangement. Transimpedance amplifiers in the monitors or in control unit 34 may be used to convert current signals from the photodetectors in the monitors into voltage signals for processing by analog-to-digital converters or other suitable processing circuitry. The processing circuitry may be located in the monitors or in control unit 34.

With the arrangement of FIG. 2, control unit 34 may measure the input power $P_{IN}$ of the optical data signals received at input fiber 26 and may measure the output power $P_{OUT}$ of the corresponding amplified optical data signals at output fiber 28. The current gain G of the amplifier 18 may be determined by using control unit 34 to determine the ratio of $P_{OUT}/P_{IN}$. Control unit 34 may adjust the current or currents used to control the gain of semiconductor optical amplifier device 30 in real time to ensure that a desired gain level is maintained.

Control unit 34 may use any suitable feedback control technique or other suitable control technique in making these adjustments to device 30. As an example, control unit 34 may use the proportional-integral-derivative (PID) control technique or other suitable feedback control technique to ensure that the actual measured gain G does not deviate significantly from a desired or set-point gain level $G_{DESIRED}$ during operation. Information on the appropriate desired gain level $G_{DESIRED}$ at which amplifier 18 (or other equipment 20) is to be operated may be provided to the amplifier or equipment locally or from the network management system (e.g., over a path such as path 24).

Other monitoring arrangements may also be used. For example, external optical monitoring equipment may be used to monitor the gain of the amplifier and information on the gain of the amplifier may be passed to the amplifier over an appropriate communications path. The optical monitoring arrangement may use an internal or external optical channel monitor or optical spectrum analyzer, etc.

If desired, an open-loop configuration may be used for adjusting the gain of device 30. This type of arrangement may be used, for example, when the performance of device 30 is sufficiently well characterized that control unit 34 may adjust the gain level for device 30 (and amplifier 18) without relying on feedback measurements (or at least not relying significantly or exclusively on such measurements). Under an open-loop scenario, control unit 34 may adjust the gain of device 30 (and thereby the gain level of amplifier 18) by setting the current (or currents) that are used to control the gain level to appropriate levels for producing the desired gain level. Information on the appropriate current levels to use for a given desired gain level may be stored in memory 34 or any other suitable arrangement may be used.

Figure 3:
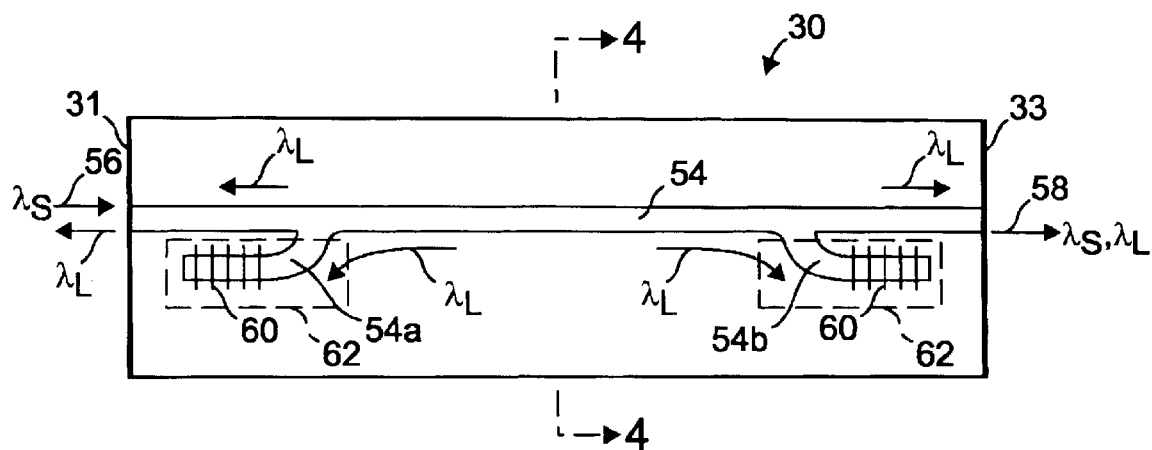
FIG. 3 is a top view of an illustrative semiconductor optical amplifier device in accordance with the present invention.

A top view of an illustrative semiconductor optical amplifier device 30 is shown in FIG. 3. Device 30 may be formed using any suitable semiconductor materials system. For example, if it is desired to produce amplification in a wavelength range suitable for long-haul fiber-optic communications (e.g., S-band, C-band, or L-band signals), device 30 may be based on an indium phosphide material system. The active region in device 30 (buried beneath the surface of device 30 and not shown in FIG. 3) may be made up of bulk semiconductor material, quantum well structures, quantum wire structures, or quantum dot structures. When provided with current, the active region produces optical gain through the well-known semiconductor optical amplification process.

Figure 4:
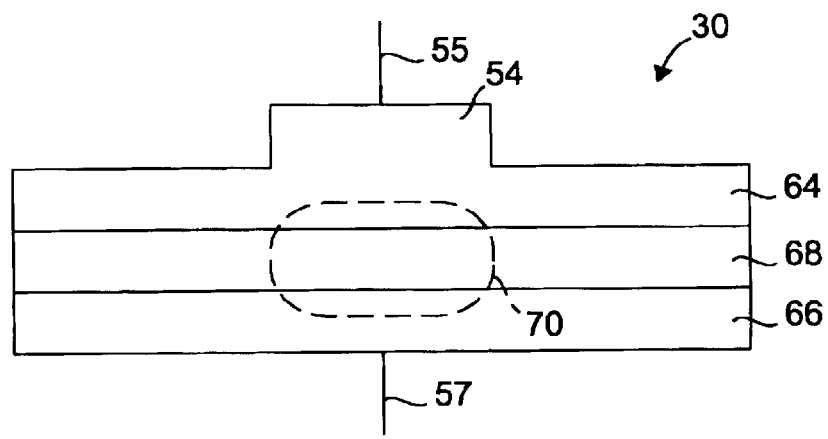
FIG. 4 is a cross-sectional view of the illustrative semiconductor optical amplifier device of FIG. 3 taken along the line 4—4 of FIG. 3.

A waveguide such as waveguide 54 may be used to provide confinement of the optical data signals being amplified by the active region portion. Waveguide 54 may be a ridge waveguide, a strip-loaded waveguide, or any other suitable waveguide. An illustrative cross-sectional view of waveguide 54 taken along the line 4—4 is shown in FIG. 4. Light is vertically confined in layer 68 between layers 64 and 66, which have lower indices of refraction than layer 68. Horizontal confinement is provided by the ridge structure of waveguide 54, which creates a higher effective index of refraction for the portion of layer 68 that lies under the ridge than for the portions of layer 68 to either side of this region. With this arrangement, light is guided in the region given by dotted line 70. Current may be provided to device 30 through paths such as paths 55 and 57. The active region may extend throughout the entire vertical height of layer 68, may be made up from one or more sublayers of layer 68, or other suitable active region arrangements may be used. The optical signals in the waveguide 54 are amplified by the portions of the active region included in waveguide 54 (e.g., the active region volume that is intersected by the light traveling along waveguide 54 in the dotted line region 70).

As shown by arrow 56 in FIG. 3, the light in the signal band that is to be amplified ($\lambda_S$) may be introduced at one end of the waveguide 54. After amplification by the optical gain provided by the active region, the light at $\lambda_S$ (optical data signals) may exit the other end of waveguide 54, as shown by arrow 58. The ends of device 30 may be coated with antireflection coatings 31 and 33. Such antireflection coatings may result in reflectivities at $\lambda_S$ and $\lambda_L$ on the order of $10^{-4}$.

The gain of device 30 may be clamped by creating an optical resonator that supports lasing at a wavelength $\lambda_L$ that is outside of the signal band. The resonator may be formed using any suitable optical feedback arrangement that allows the amount of feedback at $\lambda_L$ to be adjusted. As shown in FIG. 4, some of the light at $\lambda_L$ may exit the front and rear endfaces of device 30.

In the example of FIG. 3, the main waveguide structure has feedback structures formed from branched waveguide sections 54a and 54b. A Y-branch structure may be used to optically couple sections 54a and 54b to waveguide 54 or any other suitable coupling arrangement may be used (e.g., a coupling arrangement may be used that is based on waveguide sections that are close enough to waveguide 54 to allow evanescent wave coupling between waveguide 54 and sections 54a and 54b, but that do not allow sections 54a and 54b to touch waveguide 54).

The optical coupling between waveguide portion 54 and branch sections 54a and 54b causes some of the light that is traveling in waveguide 54 (e.g., 2%) to be diverted into the branch sections 54a and 54b. Each section may have a grating 60 or other arrangement that reflects light back into the main waveguide 54 at $\lambda_L$. The reflectivity of the grating may be on the order of 10 to 20% (as an example). Gratings 60 having the appropriate periodicity to reflect light at $\lambda_L$ may be formed (for example) using e-beam lithography or using an interference pattern formed by two UV light beams that are incident on the branch waveguide portion of device 30 during the fabrication process.

One or both of the branch waveguide sections may have contact pads (shown by dotted lines 62). Current may be applied to device 30 using such contact pad arrangements. The current may be adjusted (e.g., by control unit 34). The current produces gain (e.g., a gain of about 10) in the branch section due to the active region of the branch section, so that there is a variable amount of feedback associated with the branch waveguide sections. With the illustrative arrangement of FIG. 3, the amount of feedback is determined by the amount of optical coupling between guide 54 and each branch section, by the grating reflectivity, and by the adjustable gain region associated with the branch section (e.g., the active region under the contact pad).

Light resonates between the gratings 56 at $\lambda_L$, forming a laser cavity. (Because the effective reflectivities of the feedback structures are greater than the reflectivities of the antireflection-coated endfaces of the device, lasing occurs in the lasing cavity defined by the feedback structures, not the endface-to-endface cavity.) The effective reflectivities of the feedback structures (i.e., the amount of optical feedback) at each of the laser cavity ends establishes a loss value for the light at $\lambda_L$. For example, the effective reflectivity at each end may be $10^{-3}$, so the roundtrip loss for the cavity may be $10^{-6}$.

For a given set of reflectivities (e.g., when the current through the contact pads 62 of FIG. 3 is fixed), the loss value remains fixed. When the loss value is fixed, the light intensity in waveguide 54 at $\lambda_L$ will automatically adjust itself until the gain of the cavity exactly compensates for the loss of the cavity. For example, the light intensity at $\lambda_L$ may initially be low. If the intensity is low, the number of carriers in the active region that are lost in producing output light will be small. This will cause the number of carriers in the active region and therefore the gain to rise. The gain will rise in this way until the loss and gain are balanced at $\lambda_L$. For example, if the loss is $10^{-6}$, the gain may be $10^6$, if the loss is $10^{-7}$, the gain may be $10^7$ etc. The gain cannot rise more, because this would lead to an unsustainable increase in steady-state level of the laser light at $\lambda_L$.

Figure 5:
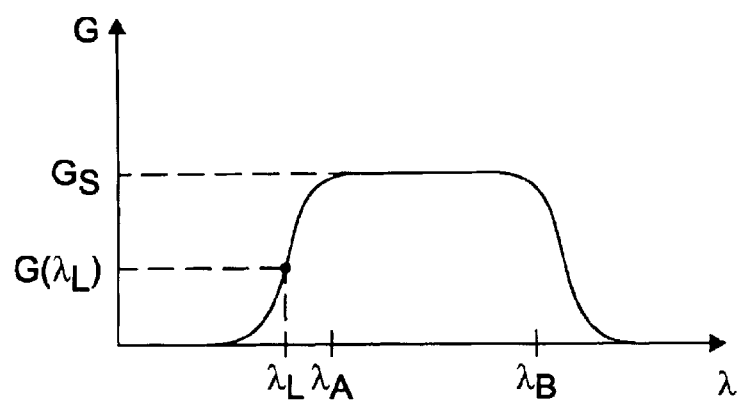
FIG. 5 is a graph showing how the amplifier device of FIGS. 3 and 4 exhibits gain clamping in accordance with the present invention.

Accordingly, for cavity ends having a given set of reflectivities, the gain at $\lambda_L$ is fixed or clamped at a gain level of $G_L$, as shown in the graph of FIG. 5. This fixes the total number of carriers in the active region, which in turn clamps the gain for signals in the signal band between $\lambda_A$ and $\lambda_B$ at a clamped level $G_S$. By clamping the gain at $G_S$, changes in the gain due to changes in the signal strength in the signal band are minimized, so that signal crosstalk is minimized.

When it is desired to change the level of the clamped gain, the amount of current used to drive the active region under the branch sections 54a and 54b may be adjusted. By adjusting the current through pads 62, the amount of gain in the active regions of the branch sections is adjusted, which adjusts the feedback at the cavity ends (the effective reflectivities of each end of the laser cavity at $\lambda_L$). The control unit 34 may adjust these currents to adjust the loss of the cavity at $\lambda_L$, thereby changing the level of the steady-state light output at $\lambda_L$. With this approach, the gain clamped gain level in the signal band $G_S$ may be adjusted higher or lower. The amount of drive current associated with the main waveguide portion 54 need not be adjusted, provided that it is sufficient to sustain the desired gain level $G_S$. If desired, this current level may be adjusted from time to time to ensure that the device 30 is not over-driven (and therefore susceptible to excess spontaneous emission noise).

Because device 30 is gain clamped by the resonant cavity formed by the feedback at $\lambda_L$, crosstalk between optical data signals on different channels in the signal band is suppressed. The feedback gratings 60 are out of the signal path, which reduces grating-induced losses for the in-band signal light traveling along waveguide 54. The amount of feedback may be adjusted, so that the gain-clamped gain level $G_S$ may be adjusted.

If desired, the gain level $G_S$ may be adjusted during the manufacturing process (or after field installation) to ensure that amplifier 18 or other equipment 20 produces a desired gain level (e.g., the nominal gain level for a given amplifier design). This helps to enhance manufacturing yield.

The gain level may also be adjusted as each of various amplifier or equipment units of a given design are installed at various different network locations. When one of these amplifier units is installed at a location where a high gain is desired, the clamped gain level may be set to a relatively high level. When another of these amplifier units is installed at a location where a low gain is desired, the clamped gain level may be set to a relatively low level.

The clamped gain level may also be adjusted when the network conditions for a particular amplifier change. For example, it may be desired to adjust the gain of a given amplifier when additional components are introduced to the system that increase or decrease the optical losses in the system or when losses vary due to adjustments made in certain components.

If desired, device 30 may be provided with integral photodetector structures at the ends of one or both branch waveguide sections 54a and 54b. Such photodetectors may be used as optical monitors (e.g., to determine the light intensity in device 30 at $\lambda_L$).

Figure 6:
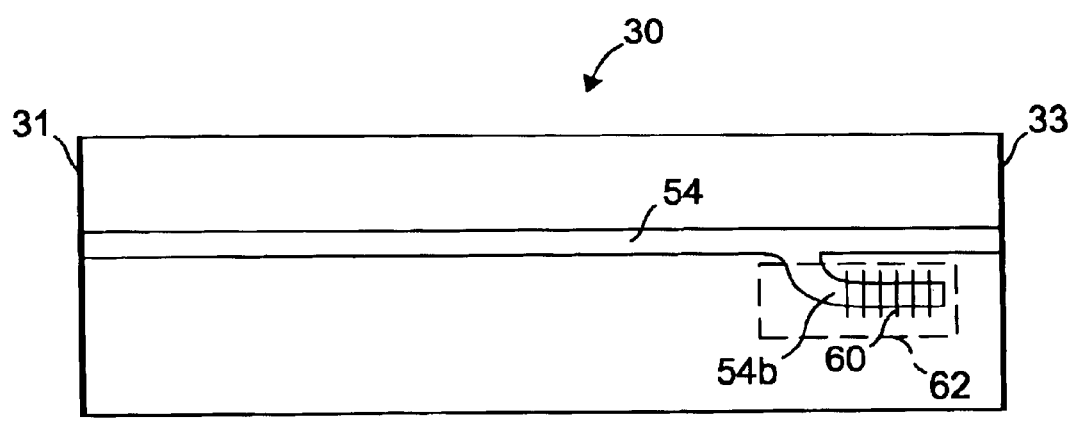
FIG. 6 is a top view of another illustrative gain-clamped semiconductor optical amplifier device with adjustable gain in accordance with the present invention.

As shown in FIG. 6, semiconductor optical amplifier device 30 may have only one adjustable feedback structure (formed, e.g., using waveguide branch section 54b, grating 60, and contact pad 62). With this type of configuration, one end of the lasing cavity is formed by the feedback structure and the other end of the lasing cavity is formed by the device endface with coating 31 (which has a non-zero reflectivity at $\lambda_L$). As in the configuration of FIG. 3, the lasing cavity is defined by the feedback structure at one end and a device endface at the other, because this cavity has lower overall losses than the cavity formed by the two endfaces.

Although the features of the gain-clamped semiconductor optical amplifier arrangements of the present invention have often been described in connection with semiconductor optical amplifiers for optical communications networks, this is merely illustrative. Any suitable device or network equipment that uses one or more gain stages may use these features if desired.

It will be understood that the foregoing is merely illustrative of the principles of this invention, and that various modifications can be made by those skilled in the art without departing from the scope and spirit of the invention.

What is claimed is:

1. A gain-clamped semiconductor optical amplifier device having an adjustable gain level for amplifying optical data signals in a signal band in an optical communications network, comprising:
   a waveguide including an active region that provides optical gain at a gain level that amplifies the optical data signals in the signal band; and
   at least one adjustable feedback structure that provides optical feedback for light at a lasing wavelength outside of the signal band, wherein the at least one adjustable feedback structure forms at least part of a laser cavity at the lasing wavelength, wherein the light at the lasing wavelength travels through the waveguide and clamps the gain level for the optical data signals, and wherein the gain level for the optical data signals is adjusted by controlling the optical feedback for the light at the lasing wavelength, wherein the feedback structure includes a grating that reflects light at the lasing wavelength and wherein the optical data signals in the signal band traverse the entire waveguide without passing through the grating.

2. The semiconductor optical amplifier device defined in claim 1 wherein the feedback structure includes an adjustable gain region.

3. A gain-clamped semiconductor optical amplifier device having an adjustable gain level for amplifying optical data signals in a signal band in an optical communications network, comprising:
   a waveguide including an active region that provides optical gain at a gain level that amplifies the optical data signals in the signal band; and
   at least one adjustable feedback structure that provides optical feedback for light at a lasing wavelength outside of the signal band, wherein the at least one adjustable feedback structure forms at least part of a laser cavity at the lasing wavelength, wherein the light at the lasing wavelength travels through the waveguide and clamps the gain level for the optical data signals, and wherein the gain level for the optical data signals is adjusted by controlling the optical feedback for the light at the lasing wavelength, wherein the feedback structure includes a branch waveguide section into which light at the lasing wavelength is diverted from the waveguide.

4. A gain-clamped semiconductor optical amplifier device having an adjustable gain level for amplifying optical data signals in a signal band in an optical communications network, comprising:

a waveguide including an active region that provides optical gain at a gain level that amplifies the optical data signals in the signal band; and at least one adjustable feedback structure that provides optical feedback for light at a lasing wavelength outside of the signal band, wherein the at least one adjustable feedback structure forms at least part of a laser cavity at the lasing wavelength, wherein the light at the lasing wavelength travels through the waveguide and clamps the gain level for the optical data signals, and wherein the gain level for the optical data signals is adjusted by controlling the optical feedback for the light at the lasing wavelength, wherein the feedback structure includes a branch waveguide section into which light, at the lasing wavelength is diverted from the waveguide and a grating on the branch waveguide that reflects at least some of the diverted light at the lasing wavelength back into the waveguide.

5. A gain-clamped semiconductor optical amplifier device having an adjustable gain level for amplifying optical data signals in a signal band in an optical communications network, comprising:

a waveguide including an active region that provides optical gain at a gain level that amplifies the optical data signals in the signal band; and at least one adjustable feedback structure that provides optical feedback for light at a lasing wavelength outside of the signal band, wherein the at least one adjustable feedback structure forms at least part of a laser cavity at the lasing wavelength, wherein the light at the lasing wavelength travels through the waveguide and clamps the gain level for the optical data signals, and wherein the gain level for the optical data signals is adjusted by controlling the optical feedback for the light at the lasing wavelength, wherein the feedback structure includes a branch waveguide section into which light at the lasing wavelength is diverted from the waveguide, a grating on the branch waveguide that reflects at least some of the diverted light at the lasing wavelength, and an adjustable gain region.

6. An optical amplifier for amplifying optical data signals in a signal band in an optical communications network, comprising:

a gain-clamped semiconductor optical amplifier device with an adjustable gain level that amplifies the optical data signals; and a control unit that controls the gain level by controlling optical feedback in the device at a wavelength of light outside the signal band, wherein the semiconductor optical amplifier device includes a feedback structure having a branch waveguide section into which light at the lasing wavelength is diverted from a waveguide in which the optical data signals travel.

7. The optical amplifier defined in claim 6 further comprising taps and optical monitors for measuring the optical gain of the semiconductor optical amplifier device.

8. The optical amplifier defined in claim 6 wherein the control unit is configured to receive information on a desired level for the adjustable gain level from a network management system.

9. An optical amplifier for amplifying optical data signals in a signal band in an optical communications network, comprising:

a gain-clamped semiconductor optical amplifier device with an adjustable gain level that amplifies the optical data signals; and a control unit that controls the gain level by controlling optical feedback in the device at a wavelength of light outside the signal band, wherein the semiconductor optical amplifier device includes a waveguide in which the optical data signals travel and wherein the semiconductor optical amplifier device includes a feedback structure having a branch waveguide section into which light at the lasing wavelength is diverted from the waveguide and a grating on the branch waveguide that reflects at least some of the diverted light at the lasing wavelength back into the waveguide.

10. An optical amplifier for amplifying optical data signals in a signal band in an optical communications network, comprising:

a gain-clamped semiconductor optical amplifier device with an adjustable gain level that amplifies the optical data signals; and a control unit that controls the gain level by controlling optical feedback in the device at a wavelength of light outside the signal band, wherein the semiconductor optical amplifier device includes a waveguide in which the optical data signals travel and wherein the semiconductor optical amplifier device includes a feedback structure having a branch waveguide section into which light at the lasing wavelength is diverted from the waveguide, a grating on the branch waveguide that reflects at least some of the diverted light at the lasing wavelength, and an adjustable gain region.

11. Optical network equipment that handles optical data signals in a signal band in an optical communications network, comprising:

a gain-clamped semiconductor optical amplifier device with an adjustable gain level that amplifies the optical data signals; and a control unit that controls the gain level by controlling optical feedback of light in the semiconductor optical amplifier device, wherein the semiconductor optical amplifier device includes a waveguide and at least one branched waveguide section that provides optical feedback.

* * * * *